(12) United States Patent
Kida

(10) Patent No.: US 12,333,108 B2
(45) Date of Patent: Jun. 17, 2025

(54) TOUCH PANEL AND TOUCH-PANEL-EQUIPPED DISPLAY DEVICE

(71) Applicant: Sharp Display Technology Corporation, Kameyama (JP)

(72) Inventor: Kazutoshi Kida, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/671,907

(22) Filed: May 22, 2024

(65) Prior Publication Data

US 2024/0427452 A1     Dec. 26, 2024

(30) Foreign Application Priority Data

Jun. 26, 2023   (JP) ................................. 2023-104578

(51) Int. Cl.
*G06F 3/041*     (2006.01)
*G06F 3/044*     (2006.01)

(52) U.S. Cl.
CPC ........ *G06F 3/04164* (2019.05); *G06F 3/0443* (2019.05)

(58) Field of Classification Search
None
See application file for complete search history.

(56) References Cited

U.S. PATENT DOCUMENTS

| | | | |
|---|---|---|---|
| 11,709,559 B2 * | 7/2023 | Han | G06F 3/0446 345/173 |
| 2012/0229417 A1 * | 9/2012 | Badaye | G06F 3/04166 345/174 |
| 2014/0293163 A1 * | 10/2014 | Ju | G06F 3/0443 349/12 |
| 2020/0019275 A1 * | 1/2020 | Gao | G06F 3/03545 |
| 2020/0110488 A1 * | 4/2020 | Kim | G06F 3/0443 |
| 2020/0174608 A1 * | 6/2020 | Lee | G06F 1/1626 |
| 2022/0317810 A1 * | 10/2022 | Wang | G06F 3/0445 |
| 2024/0107850 A1 * | 3/2024 | Xu | G06F 3/0412 |

FOREIGN PATENT DOCUMENTS

| | | | | |
|---|---|---|---|---|
| CN | 102667693 A | * | 9/2012 | G01D 5/24 |
| CN | 118284869 A | * | 7/2024 | |
| JP | 2017-049659 A | | 3/2017 | |

* cited by examiner

*Primary Examiner* — Duane N Taylor, Jr.
(74) *Attorney, Agent, or Firm* — ScienBiziP, P.C.

(57) ABSTRACT

A touch panel includes a first touch detection electrode including a first main portion and a first sub-portion, a second touch detection electrode including a second main portion and a second sub-portion, a first connecting line that connects the first main portion and the first sub-portion, and a second connecting line that connects the second main portion and the second sub-portion. The first sub-portion is disposed away from the first main portion. The second sub-portion is disposed away from the second main portion. The first and second sub-portions are disposed between the first and second main portions. The first and second connecting lines are formed in a layer that is a different layer from a layer in which the first and second touch detection electrodes are formed.

7 Claims, 12 Drawing Sheets

COMPARATIVE EXAMPLE

TOUCH PANEL AND TOUCH-PANEL-EQUIPPED DISPLAY DEVICE

BACKGROUND

1. Field

The present disclosure relates to a touch panel and a touch-panel-equipped display device.

2. Description of the Related Art

A touch panel according to Japanese Unexamined Patent Application Publication No. 2017-049659 includes a plurality of cross-like sensors that are sensor elements having a cross-like shape, a plurality of letter-L-like sensors that are sensor elements having a letter-L-like shape, a plurality of letter-T-like sensors having a letter-T-like shape, and a cover glass. The plurality of cross-like sensors are disposed in a matrix. The letter-L-like sensors are disposed at corner portions of the touch panel. The letter-T-like sensors are disposed at edge portions of the touch panel. The touch panel finds a center of gravity of a contact region that is a region of the touch panel touched by an indicator, on the basis of capacitance of a plurality of the sensor elements. The touch panel finds touch coordinates on the basis of the center of gravity of the touch region.

Now, in the touch panel described in the aforementioned Japanese Unexamined Patent Application Publication No. 2017-049659, doing away with the cover glass, or making the cover glass thinner, results in distance between the sensor elements and the indicator (pen or the like) that is the object of detection to be closer. Accordingly, while signals from sensor elements that are touched by the indicator (touch detection electrodes) are stronger, signals from sensor elements adjacent to these sensor elements are weaker. Due to the signals from adjacent sensor elements being weaker, signals of the adjacent sensor elements are not usable. Accordingly, there is a problem in that the center of gravity of the contact region, which is used for finding the touch coordinates, is not accurately found, resulting in lower precision in detection of touch coordinates.

It is desirable to provide a touch panel and a touch-panel-equipped display device in which detection precision of touch coordinates can be improved.

SUMMARY

According to a first aspect of the disclosure, there is provided a touch panel that includes a substrate, a first touch detection electrode that is disposed on the substrate and generates capacitance between the first touch detection electrode and an indicator, a second touch detection electrode that is formed in a first layer in which the first touch detection electrode is formed, and that is disposed at a position in a first direction as to the first touch detection electrode, a first touch detection electrode line that connects the first touch detection electrode and a detection circuit that receives a signal from the first touch detection electrode, and a second touch detection electrode line that connects the second touch detection electrode and a detection circuit that receives a signal from the second touch detection electrode. The first touch detection electrode includes a first main portion to which the first touch detection electrode line is connected, and a first sub-portion that is disposed away from the first main portion. The second touch detection electrode includes a second main portion to which the second touch detection electrode line is connected, and a second sub-portion that is disposed away from the second main portion. The first sub-portion and the second sub-portion are disposed between the first main portion and the second main portion. The touch panel further includes a first connecting line that is formed in a second layer that is different from the first layer, and that connects the first main portion and the first sub-portion, and a second connecting line that is formed in a third layer that is different from the first layer, and that connects the second main portion and the second sub-portion.

A touch-panel-equipped display device according to a second aspect includes the touch panel according to the first aspect, and a pixel electrode formed on the substrate.

DESCRIPTION OF THE EMBODIMENTS

Figure 1:
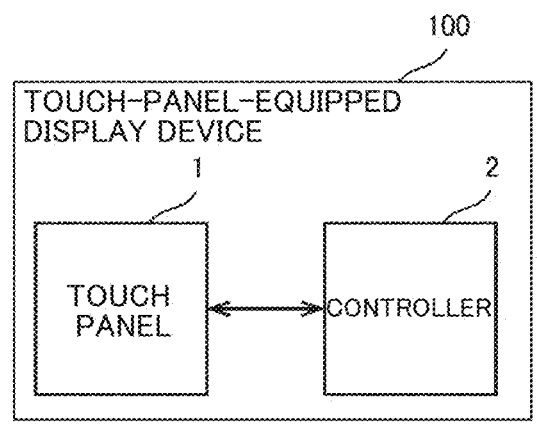
FIG. 1 is a block diagram illustrating a schematic configuration of a touch-panel-equipped display device according to a first embodiment.

Embodiments of the present disclosure will be described below with reference to the drawings. Note that the present disclosure is not limited to the following embodiments, and design alterations may be made as appropriate within a range fulfilling the configuration of the present disclosure. Also, in the following description, parts that are the same or parts that have similar functions may be denoted by the same symbols throughout different drawings, and repetitive description thereof may be omitted. Also, various configurations described in the embodiment and modifications thereof may be combined or may be altered as appropriate without departing from the spirit of the present disclosure. Also, in the drawings which will be referenced below, configurations may be simplified or schematized in illustration, some of the constituent members may be omitted, and so forth, in order to facilitate understanding of the description. Also, the dimensional ratios among the constituent members illustrated in the drawings do not necessarily indicate actual dimensional ratios.

First Embodiment

Configuration of Touch-Panel-Equipped Display Device

FIG. 1 is a block diagram illustrating a schematic configuration of a touch-panel-equipped display device 100 (hereinafter, "display device 100") according to a first embodiment. The display device 100 includes a touch panel 1 and a controller 2. Note that while the touch panel 1 and the controller 2 are illustrated as separate blocks in FIG. 1, the controller 2 may be disposed over the touch panel 1. The controller 2 includes a processor (integrated circuit) that performs control processing relating to touch detection by the touch panel 1, and control processing relating to display. The controller 2 outputs touch detection results (touch coordinates) acquired by the touch panel 1 to a host controller that is not illustrated. The controller 2 also receives image signals or video signals from the host controller, and displays images or video on the touch panel 1, on the basis of image signals or video signals.

Configuration of Touch Panel

Figure 2:
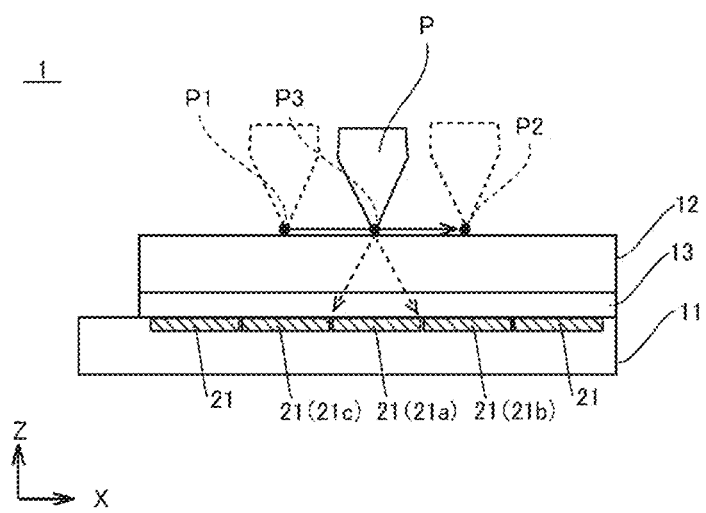
FIG. 2 is a schematic cross-sectional view of a touch panel according to the first embodiment.
Figure 3:
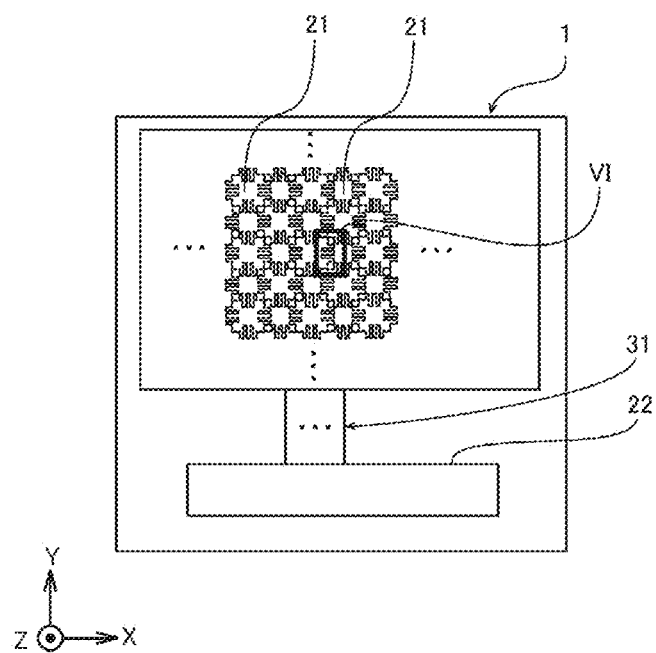
FIG. 3 is a plan schematic view of the touch panel.

FIG. 2 is a schematic cross-sectional view of the touch panel 1 according to the first embodiment. FIG. 3 is a plan schematic diagram of the touch panel 1. The touch panel 1 detects touches by an indicator P. Pens and fingers are included in the term "indicator". The touch panel 1 includes a thin-film transistor substrate 11 (hereinafter referred to as "TFT substrate 11"), a color filter substrate 12 (hereinafter referred to as "CF substrate 12"), and a liquid crystal layer 13. The liquid crystal layer 13 is disposed between the TFT substrate 11 and the CF substrate 12. Also, in the first embodiment, no cover glass is provided to the touch panel 1. Note that illustration of optical members is omitted in FIG. 2.

The touch panel 1 is, for example, an in-cell type touch panel. Touch detection electrodes 21 serve as electrodes for detecting touches, and also as counter electrodes (common electrode) for formation of an electric field between themselves and pixel electrodes 42 (see FIG. 4) for displaying video. As illustrated in FIG. 3, a plurality of the touch detection electrodes 21 are disposed in a matrix, for example. Note that here, a normal direction of the touch panel 1 is a Z direction, one direction in which the plurality of touch detection electrodes 21 are arrayed (right direction of page) is an X direction, and a direction orthogonal to the X direction and the Z direction is a Y direction.

Also, the touch panel 1 includes a drive circuit 22. The drive circuit 22 includes a touch detection driver (detection circuit). The plurality of touch detection electrodes 21 and the drive circuit 22 (touch detection driver) are connected via respective touch detection lines 31.

In detail, the touch panel 1 is a self-capacitance type touch panel. As illustrated in FIG. 2, the plurality of touch detection electrode 21 exhibit capacitive coupling with the indicator P, whereby capacitance thereof changes. The drive circuit 22 supplies touch drive signals (pulse signals) to the plurality of touch detection electrodes 21. Waveforms of the pulse signals change in accordance with the magnitude of the capacitance of the touch detection electrodes 21. In the example illustrated in FIG. 2, the magnitude of capacitance changes the most at a touch detection electrode 21a where the indicator P is situated directly above. Also, capacitances of touch detection electrodes 21b and 21c that are adjacent to the touch detection electrode 21a change as well. The drive circuit 22 detects a touch position of touching by the indicator P (touch coordinates) on the basis of the waveforms of the pulse signals from the plurality of touch detection electrodes 21 (hereinafter referred to as "detection signals"). For example, the drive circuit 22 creates a map of intensity of detection signals, on the basis of the detection signals from the plurality of touch detection electrodes 21, and takes a center-of-gravity position found form the map as the touch position (touch coordinates). Note that the term "touch" is not limited to the indicator P coming into contact with the touch panel 1, and is a concept including the indicator P coming into close proximity with the touch panel 1.

Figure 4:
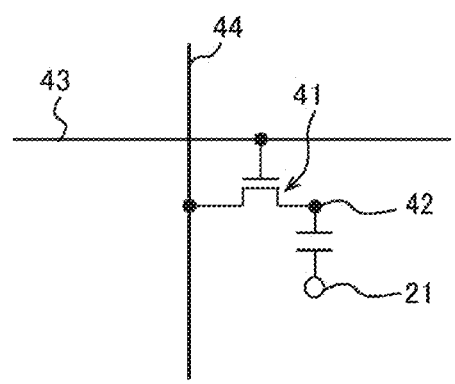
FIG. 4 is a circuit diagram for describing a relation between a thin-film transistor (TFT) and a touch detection electrode.

FIG. 4 is a circuit diagram for describing a relation between a thin-film transistor 41 and the touch detection electrode 21. The drive circuit 22 (see FIG. 3) further includes a gate driver and a source driver. The gate driver of the drive circuit 22 is connected to a gate line 43. The source driver of the drive circuit 22 is connected to a source line 44. A gate electrode of the thin-film transistor 41 is connected to the gate line 43, and a source electrode of the thin-film transistor 41 is connected to the source line 44. Also, a drain electrode of the thin-film transistor 41 is connected to the pixel electrode 42. The pixel electrode 42 forms capacitance between itself and the touch detection electrode 21. The touch detection electrode 21 is provided in common to a plurality of the pixel electrodes 42, and functions as a common electrode.

The gate driver of the drive circuit 22 sequentially supplies gate signals (scanning signals) to each of a plurality of the gate lines 43. Also, the source driver of the drive circuit 22 supplies data signals based on video signals to each of a plurality of the source lines 44. Accordingly, the thin-film transistor 41 to which a gate signal is supplied goes on, whereby the data signal (source signal) is written to the pixel electrode 42. In the touch panel 1, the liquid crystal layer 13 (see FIG. 2) is driven by the electric field generated by the pixel electrode 42 and the touch detection electrode 21 (common electrode), and video is displayed.

Figure 5:
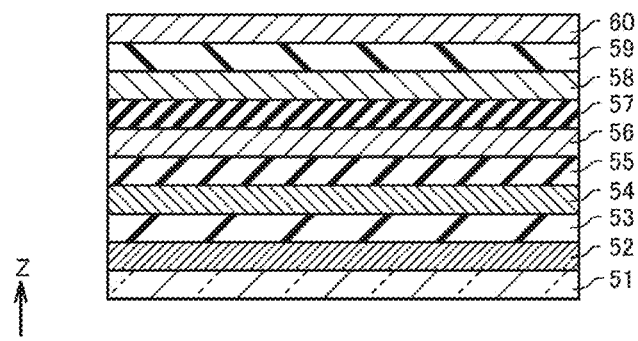
FIG. 5 is a schematic cross-sectional view of a TFT substrate.

FIG. 5 is a schematic cross-sectional view of the TFT substrate 11. The TFT substrate 11 includes a substrate 51, a gate electrode layer 52, a gate insulating layer 53, a source line layer 54, a first interlayer insulating layer 55, a touch detection line layer 56 (second layer, third layer, and fourth layer), a second interlayer insulating layer 57, a touch detection electrode layer 58 (first layer), a third interlayer insulating layer 59, and a pixel electrode layer 60, which are stacked in this order. The substrate 51 is a substrate that is made of glass or resin. The gate electrode layer 52 is a layer in which the gate line 43 and the gate electrode of the thin-film transistor 41 are formed. The gate electrode layer 52 is, for example, a layer of a metal film. The gate insulating layer 53, the first interlayer insulating layer 55, the second interlayer insulating layer 57, and the third interlayer insulating layer 59 are each made of an inorganic insulating material or an organic insulating material. The source electrode and the drain electrode of the thin-film transistor 41, and the source line 44, are formed in the source line layer 54. The source line layer 54 is, for example, a layer of a metal film. The touch detection line 31, and a later-described connecting line 75, are formed in the touch detection line layer 56. The touch detection line layer 56 is, for example, a layer of a metal film. The touch detection electrode 21 is formed in the touch detection electrode layer 58. The pixel electrode 42 is formed in the pixel electrode layer 60. The touch detection electrode layer 58 and the pixel electrode layer 60 are made of a transparent material that has conductivity, such as indium tin oxide (ITO) or the like, for example.

Figure 6:
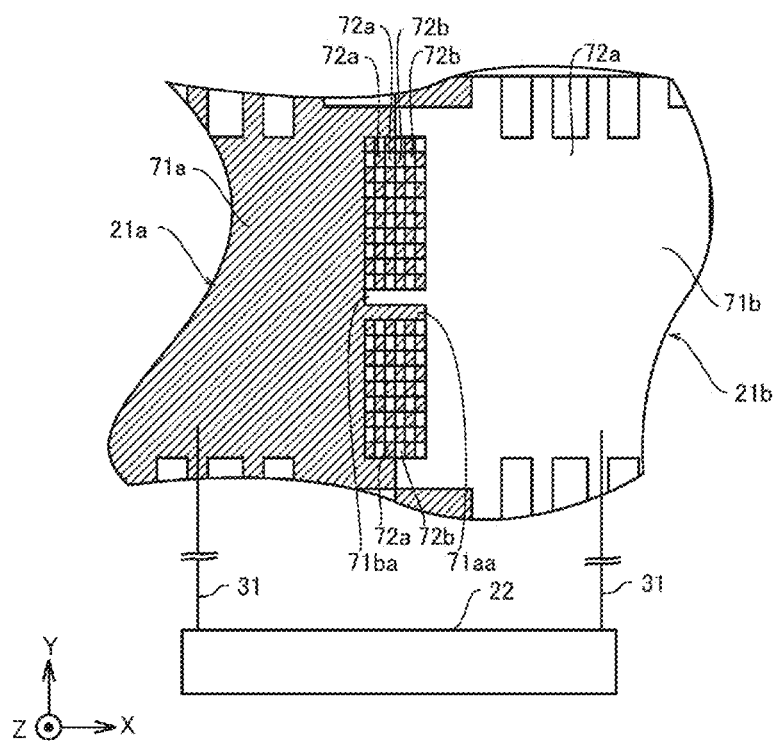
FIG. 6 is a partial enlarged view illustrating a configuration of the touch detection electrode within a region VI in FIG. 3.
Figure 7:
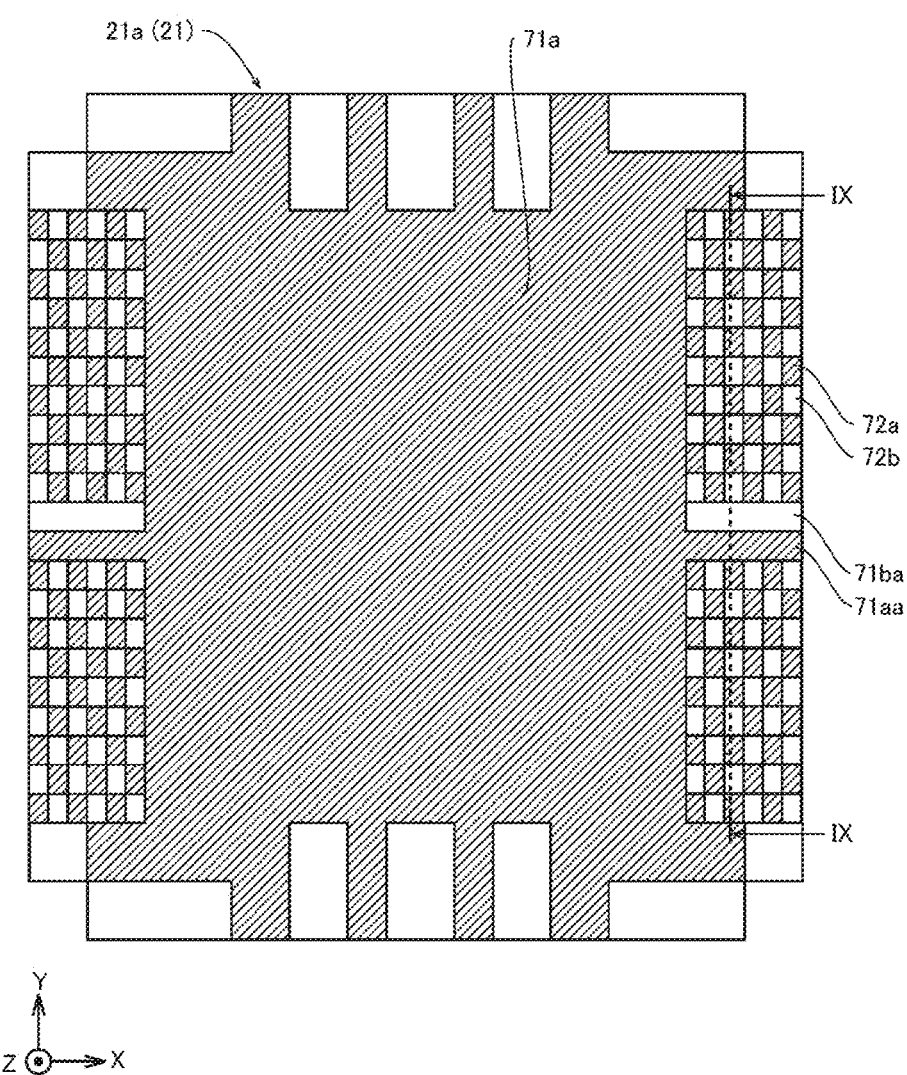
FIG. 7 is a plan view illustrating the configuration of the touch detection electrode.

FIG. 6 is a partial enlarged view illustrating a configuration of the touch detection electrode 21 within a region VI in FIG. 3. FIG. 7 is a plan view illustrating the configuration of the touch detection electrode 21. As illustrated in FIG. 6, the plurality of touch detection electrodes 21 are disposed adjacent to each other. In order to distinguish among the plurality of touch detection electrodes 21, a first touch detection electrode will be referred to as "touch detection electrode 21a", and a second touch detection electrode disposed at a position in the X direction with respect to the touch detection electrode 21a will be referred to as "touch detection electrode 21b". The touch detection electrode 21b is formed in the touch detection electrode layer 58 that is a layer in which the touch detection electrode 21a is formed. The touch detection electrodes 21a and 21b are connected to the drive circuit 22 via respective touch detection lines 31. Note that in FIGS. 6 and 7, the portion making up the touch detection electrode 21a is indicated by hatching.

The touch detection electrode 21a includes a main portion 71a, and a plurality of sub-portions 72a. The touch detection electrode 21b includes a main portion 71b, and a plurality of sub-portions 72b. A touch detection line 31 is connected to the main portion 71a. Also, a touch detection line 31 is connected to the main portion 71b.

Also, as illustrated in FIG. 7, the main portion 71a is disposed in a middle portion of the touch detection electrode 21a. That is to say, the plurality of sub-portions 72a are disposed positioned to the right direction of the page in FIG. 7 with respect to the main portion 71a, and the plurality of sub-portions 72a are disposed positioned to the left direction of the page in FIG. 7 with respect to the main portion 71a. The area of the main portion 71a is larger than the area of the sub-portions 72a. Also, the length of the main portion 71a in the X direction is greater than the length of the sub-portions 72a (each one) in the X direction, and the length of the main portion 71a in the Y direction is greater than the length of the sub-portions 72a (each one) in the Y direction. The configuration of the main portion 71b is the same as the configuration of the main portion 71a, and accordingly description will be omitted.

The plurality of sub-portions 72a are disposed away from the main portion 71a. Also, the plurality of sub-portions 72b are disposed away from the main portion 71b. The term "disposed away from" means not being contiguous in the same layer (e.g., touch detection electrode layer 58). Also, as illustrated in FIG. 6, the sub-portions 72a and 72b are disposed between the main portion 71a and the main portion 71b. As illustrated in FIG. 6, the sub-portions 72a and 72b are disposed between the main portion 71a and the main portion 71b in a manner alternating in the X direction. Also, the sub-portions 72a and 72b each have rectangular shapes, and are disposed in a checkerboard pattern in plan view.

Also, as illustrated in FIG. 6, the main portion 71a includes a protruding portion 71aa that extends toward the main portion 71b. The main portion 71b includes a protruding portion 71ba that extends toward the main portion 71a.

Figure 8:
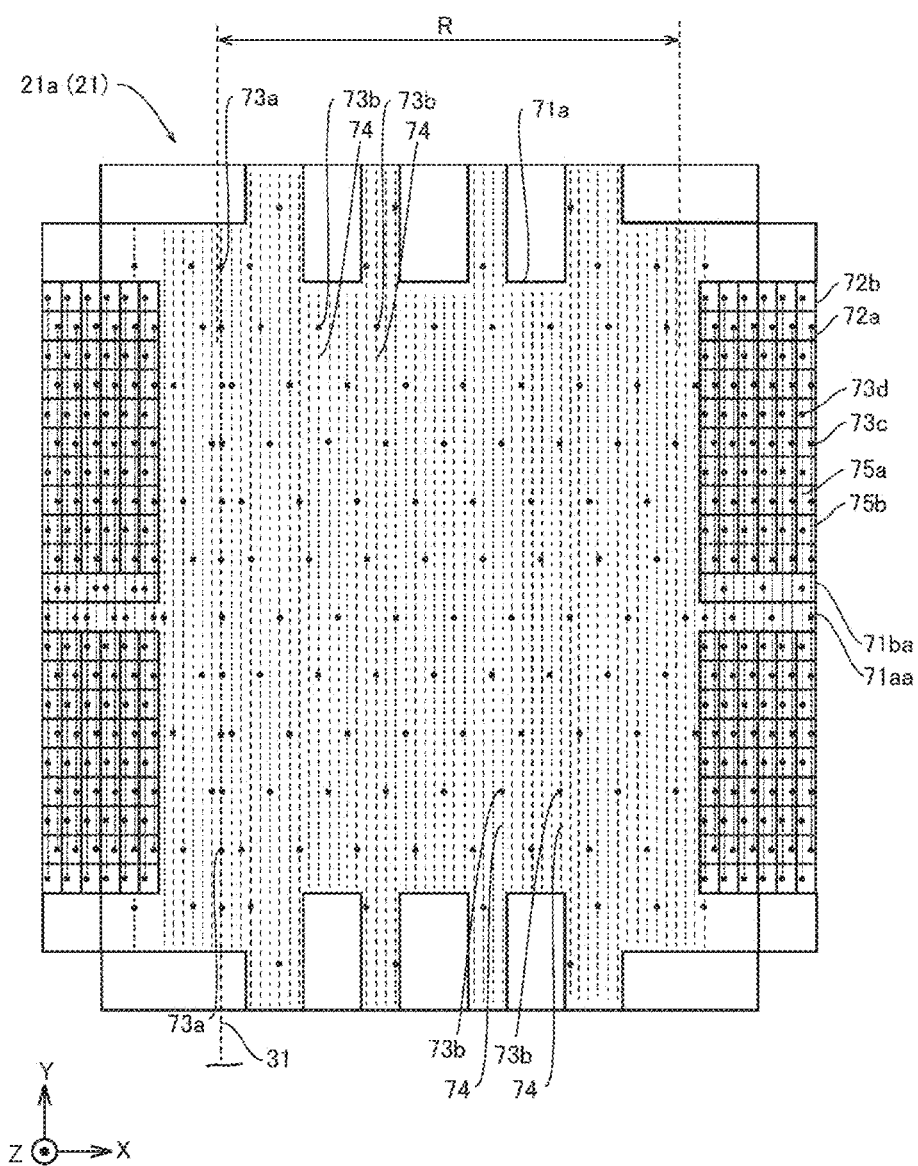
FIG. 8 is a diagram for describing a connection relation between a main portion and sub-portions.

FIG. 8 is a diagram for describing a connection relation of the main portion 71a and the sub-portions 72a. The touch detection line 31 may extend in the Y direction at a position overlapping the main portion 71a in plan view. The main portion 71a is connected to the touch detection line 31 in a plurality of contact holes 73a. Note that in the example illustrated in FIG. 8, an example in which the touch detection line 31 is disposed to the left side of the page, out of a region R in which the touch detection line 31 is disposed, is illustrated. However, in the touch detection electrode 21 on the Y-direction negative side of the touch detection electrode 21a, the touch detection line 31 is disposed at the right side of the page with respect to the touch detection line 31 illustrated in FIG. 8. Also, a plurality of capacitance forming lines 74 are provided to the touch panel 1 in parallel to the direction in which the touch detection line 31 extends (Y direction), at a position overlapping the main portion 71a in plan view. The plurality of capacitance forming lines 74 are each connected to the main portion 71a in a plurality of contact holes 73b. The distribution of capacitance within the main portion 71a is made to be uniform by the plurality of capacitance forming lines 74.

Figure 9:
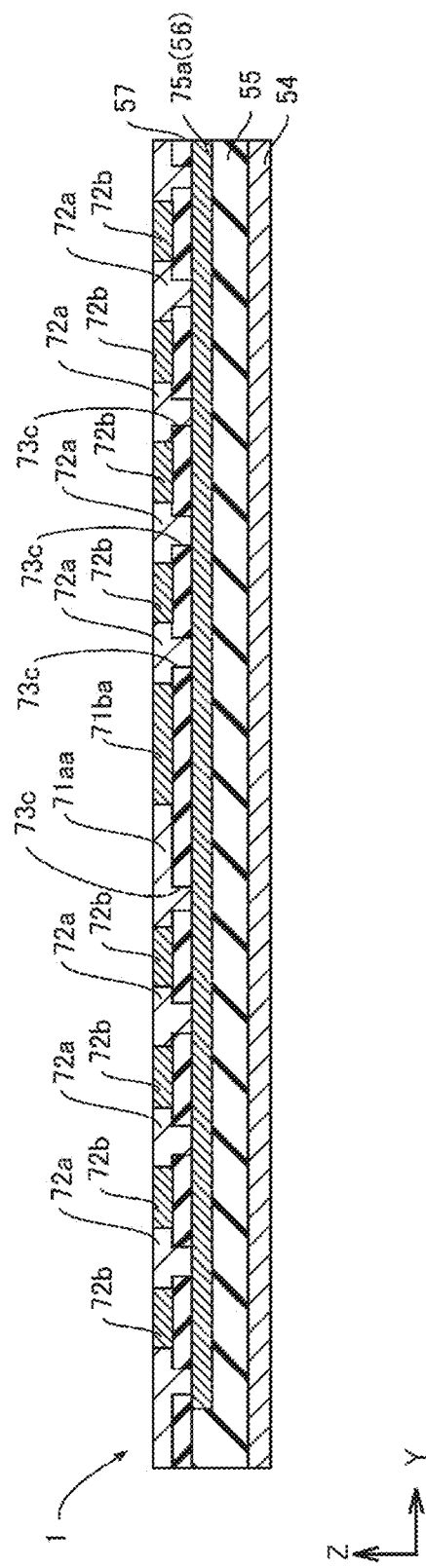
FIG. 9 is a cross-sectional view taken along line IX-IX in FIG. 7.

FIG. 9 is a cross-sectional diagram taken along line IX-IX in FIG. 7. As illustrated in FIG. 9, connecting lines 75a and 75b (see FIG. 8) that are formed in the touch detection line layer 56 that is a different layer from the touch detection electrode layer 58, are formed in the touch panel 1. That is to say, the connecting lines 75a and 75b are formed in the same layer as the layer in which the touch detection line 31 is formed. Thus, the number of manufacturing steps of the touch panel 1 can be reduced as compared to a case of forming the connecting lines in a layer that is separate from the layer in which the touch detection line is formed. Also, the connecting lines 75a and 75b can be disposed so as to overlap the touch detection electrode 21 in plan view. As a result, the size of the touch panel 1 can be reduced in a planar direction. The connecting lines 75a and 75b may extend in parallel to the direction in which the touch detection line 31 extends (Y direction). Accordingly, the touch detection line 31 does not intersect the connecting lines 75a and 75b, and thus the touch detection line 31 and the connecting lines 75a and 75b can be formed in the same layer, as described above.

The connecting line 75a is wiring that connects the main portion 71a and the sub-portions 72a. The connecting line 75b is wiring that connects the main portion 71b and the sub-portions 72b. The connecting line 75a extends from the protruding portion 71aa parallel to the direction in which the touch detection line 31 extends. The connecting line 75b extends from the protruding portion 71ba parallel to the direction in which the touch detection line 31 extends.

As illustrated in FIG. 9, contact holes 73c are provided at positions of the second interlayer insulating layer 57 overlapping the sub-portions 72a in plan view. The connecting line 75a is connected to the protruding portion 71aa of the main portion 71a and each of the sub-portions 72a in the contact holes 73c. Also, the connecting line 75a is insulated with respect to the sub-portions 72b by the second interlayer insulating layer 57. Also, the connecting line 75b is connected to the protruding portion 71ba of the main portion 71b and each of the sub-portions 72b in contact holes 73d.

According to the above configuration, the sub-portions 72a that are disposed away from the main portion 71a are electrically connected to the main portion 71a by the connecting line 75a. Also, the sub-portions 72b that are disposed away from the main portion 71b are electrically connected to the main portion 71b by the connecting line 75b. Thus, the sub-portions 72a are disposed between the main portion 71a and the main portion 71b, and the sub-portions 72b are disposed between the main portion 71a and the main portion 71b. Accordingly, even in a case in which the indicator P touches between the main portion 71a and the main portion 71b, the drive circuit 22 can acquire signals from both the touch detection electrodes 21a and 21b. As a result, touch coordinates can be found on the basis of signals from the plurality of touch detection electrodes 21 that are the touch detection electrode 21a and the touch detection electrode 21b, and accordingly the detection precision of touch coordinates can be improved.

Also, in a case in which the touch detection electrodes are made up of just the main portions, slight differences among loads of a plurality of the touch detection electrodes readily leads to variance in gradation (difference in luminance) along boundary lines of the plurality of touch detection electrodes, and there are cases where uneven luminance occurs along the boundary lines. Conversely, according to the above configuration, shapes of the boundaries are complex due to the sub-portions 72a and 72b, and uneven luminance can be suppressed.

Second Embodiment

Next, a configuration of a touch panel 201 according to a second embodiment will be described with reference to FIGS. 10 to 13. In the second embodiment, sub-portions 272a and 272c are disposed between a touch detection electrode 221a and a touch detection electrode 221c that is adjacent thereto in the Y direction. Note that configurations that are the same as the configurations in the first embodiment are denoted by the same symbols as in the first embodiment, and description thereof will be omitted.

Figure 10:
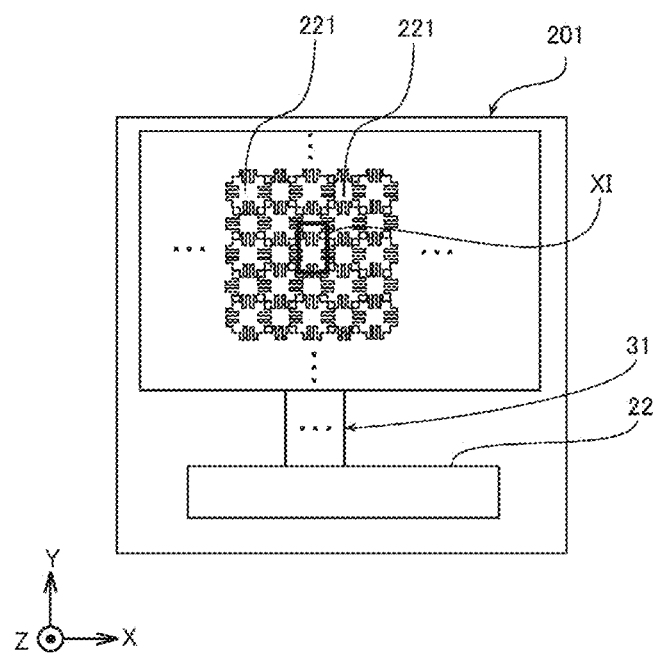
FIG. 10 is a plan schematic view of a touch panel according to a second embodiment.
Figure 11:
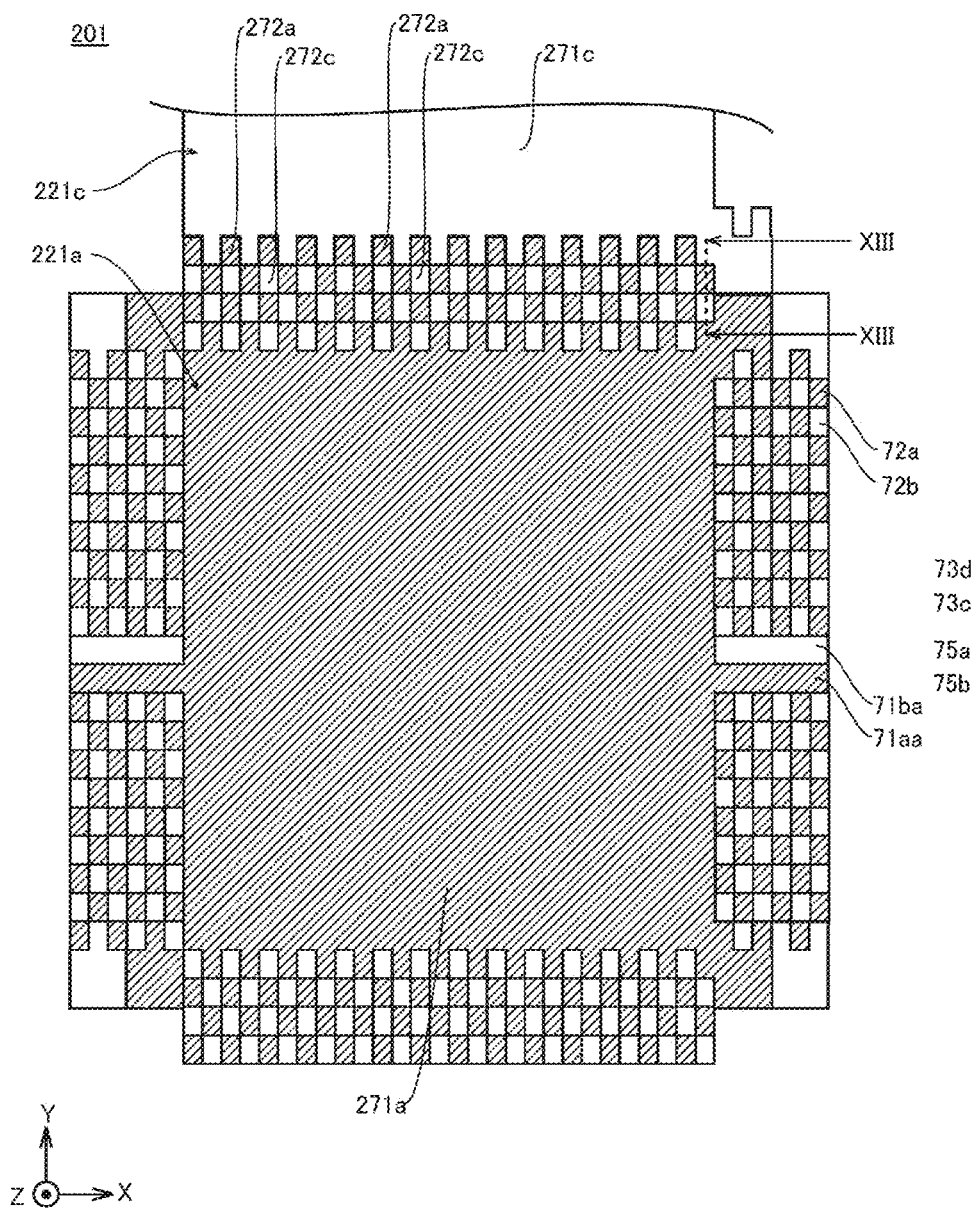
FIG. 11 is an enlarged plan view of a region XI in FIG. 10.

FIG. 10 is a plane schematic view of the touch panel 201 according to the second embodiment. FIG. 11 is an enlarged plan view of a region XI in FIG. 10. As illustrated in FIG. 10, the touch panel 201 includes a plurality of touch detection electrodes 221. The plurality of touch detection electrodes 221 are formed in a touch detection electrode layer 258 (see FIG. 13).

As illustrated in FIG. 11, the plurality of touch detection electrodes 221 may include the touch detection electrode 221a, and the touch detection electrode 221c that is situated in the Y direction as to the touch detection electrode 221a. The touch detection electrode 221a may include a main portion 271a and sub-portions 72a and 272a. The touch detection electrode 221c may include a main portion 271c and the sub-portions 272c. The sub-portions 72a may be disposed between the touch detection electrode 221a and the main portion of a touch detection electrode 221 that is adjacent to the touch detection electrode 221a in the X direction. The main portion 271c of the touch detection electrode 221c may be connected to the drive circuit 22 via the touch detection line 31 (see FIG. 10).

The sub-portions 272a are disposed away from the main portion 271a. Also, the sub-portions 272c are disposed away from the main portion 271c. The sub-portions 272a and 272c are disposed between the main portion 271a and the main portion 271c. The sub-portions 272a and the sub-portions 272c are disposed between the main portion 271a and the main portion 271c in an alternating manner. Also, the sub-portions 272a and the sub-portions 272c are disposed in a checkerboard pattern between the main portion 271a and the main portion 271c.

Figure 12:
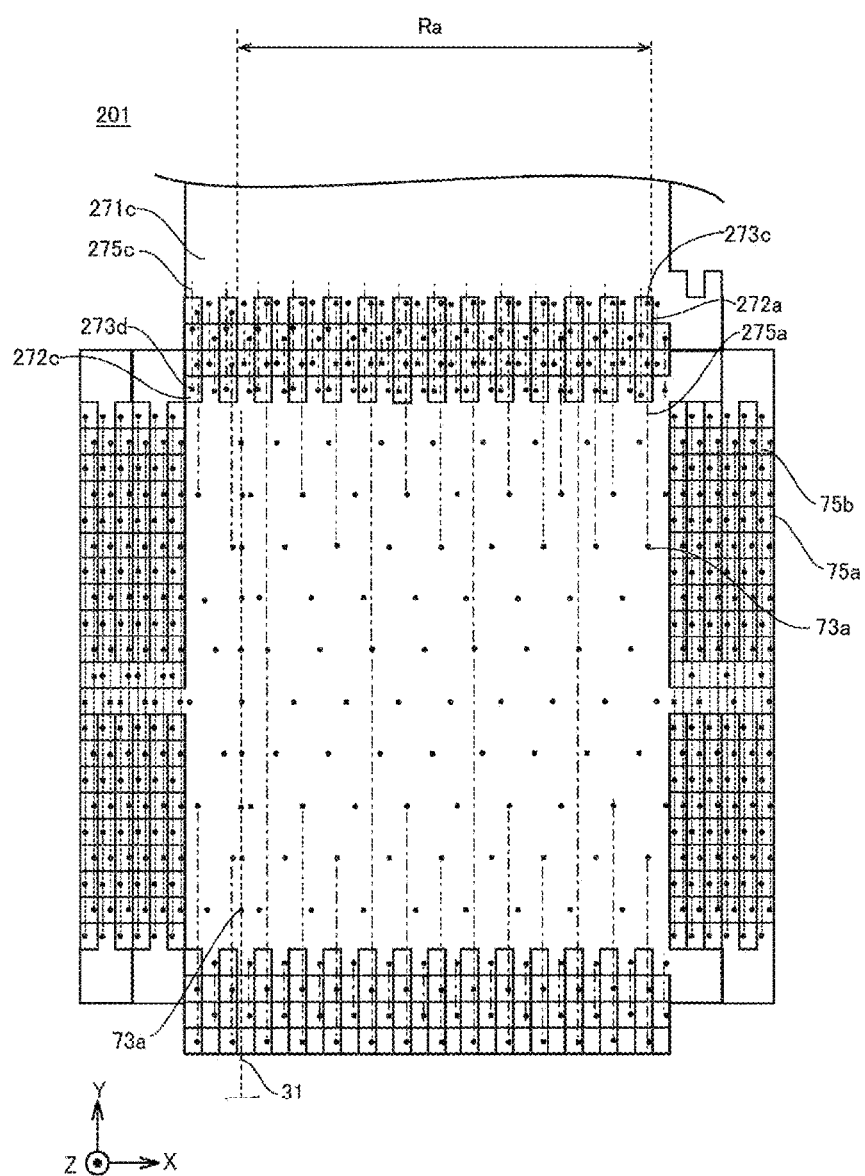
FIG. 12 is a diagram for describing connection of a main portion and sub-portions.

FIG. 12 is a diagram for describing connection of the main portion 271a and the sub-portions 272a. As illustrated in FIG. 12, the touch panel 201 may include connecting lines 275a that connect the main portion 271a and the sub-portions 272a, and connecting lines 275c that connect the main portion 271c and the sub-portions 272c. The connecting lines 275a and 275c may extend in parallel in the Y direction. Also, at least part of a plurality of the connecting lines 275a and at least part of a plurality of the connecting lines 275c are disposed at positions overlapping a region Ra, where the touch detection line 31 is disposed, in plan view.

Figure 13:
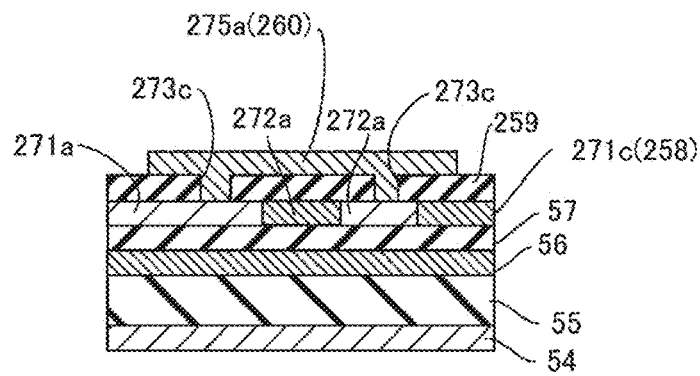
FIG. 13 is a cross-sectional view of the touch panel 201, taken along line XIII-XIII in FIG. 11.
Figure 13:

FIG. 13 is a cross-sectional view of the touch panel 201 taken along line XIII-XIII in FIG. 11. As illustrated in FIG. 13, the connecting lines 275a and 275c are formed in a pixel electrode layer 260, in which the pixel electrodes 42 are formed. That is to say, the connecting lines 275a and 275c are formed in a different layer from the touch detection electrode layer 258 in which the touch detection electrodes 221 are formed (in a higher layer than touch detection electrode layer 258), and also formed in a different layer from the touch detection line layer 56 in which the touch detection line 31 is formed (in a higher layer than touch detection line layer 56).

As illustrated in FIG. 13, the touch panel 201 includes a third interlayer insulating layer 259. A plurality of contact holes 273c and 273d (see FIG. 12) are provided in the third interlayer insulating layer 259. The connecting lines 275a are connected to the main portion 271a in the contact holes 273c. Also, the connecting lines 275a are connected to the sub-portions 272a in the contact holes 273c. Also, as illustrated in FIG. 12, the connecting lines 275c are connected to the main portion 271c in the contact holes 273d. Also, the connecting lines 275c are connected to the sub-portions 272c in the contact holes 273d. Note that while the capacitance forming lines 74 are not illustrated in FIG. 12, the capacitance forming lines 74 are provided on the touch panel 201 in the same way as in the first embodiment.

According to the second embodiment, even in a case in which the indicator P touches between the main portion 271a and the main portion 271c, the drive circuit 22 can acquire signals from both the sub-portions 272a of the touch detection electrode 221a and the sub-portions 272c of the touch detection electrode 221c. As a result, touch coordinates can be found on the basis of signals from the touch detection electrodes 221a and 221c, and accordingly the detection precision of touch coordinates can be improved in the Y direction as well. Other configurations and effects are the same as in the first embodiment.

Results of Comparison

Figure 14:
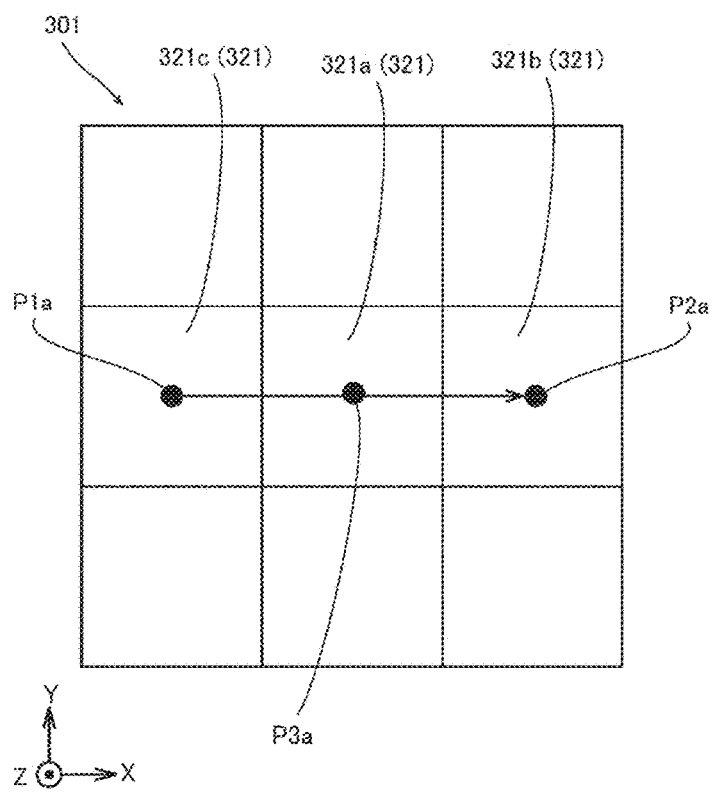
FIG. 14 is a plan view illustrating a configuration of a touch panel according to a Comparative Example.
Figure 15:
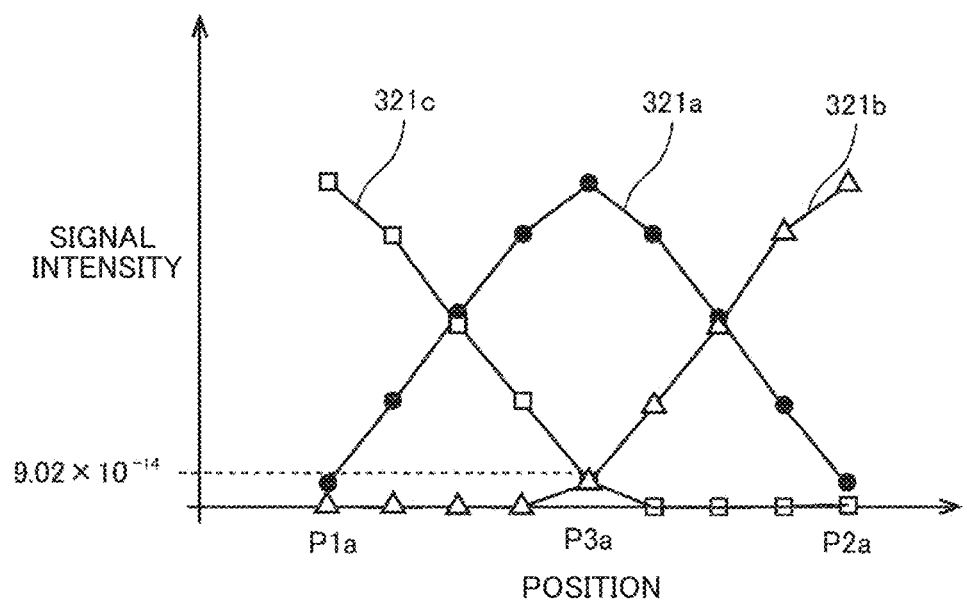
FIG. 15 is a diagram showing detection results of signal intensity of the touch panel according to the Comparative Example.
Figure 16:
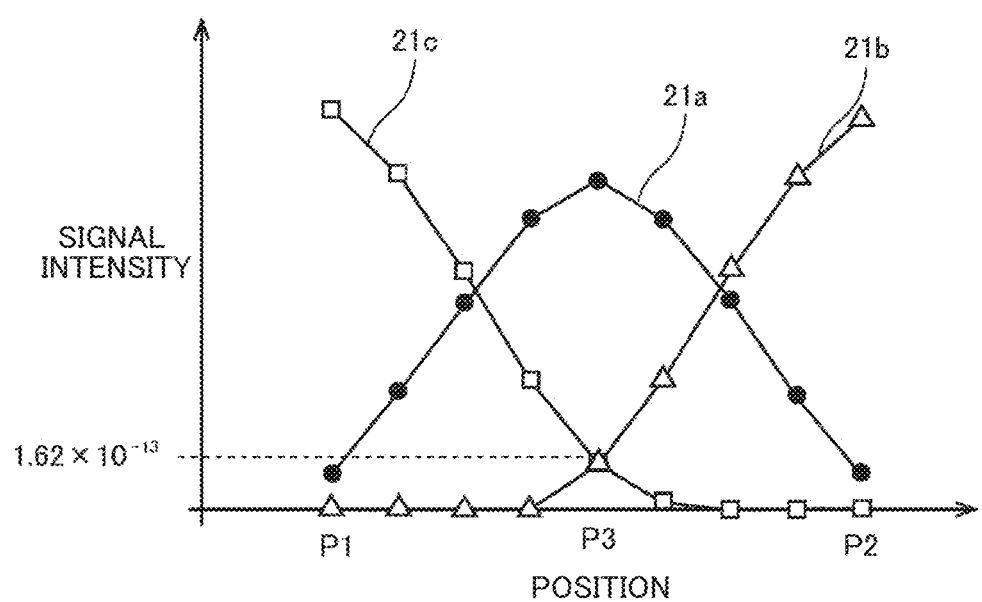
FIG. 16 is a diagram showing detection results of signal intensity of the touch panel according to an Example of the first embodiment.

Next, results of comparing a touch panel 301 according to a Comparative Example and the touch panel 1 according to an Example of the first embodiment will be described with reference to FIGS. 2 and 14 to 16. FIG. 14 is a plan view illustrating a configuration of the touch panel 301 according to the Comparative Example. FIG. 15 is a diagram showing detection results of signal intensity of the touch panel 301 according to the Comparative Example. FIG. 16 is a diagram showing detection results of signal intensity of the touch panel 1 according to the Example of the first embodiment.

Results from Comparative Example

As illustrated in FIG. 14, touch detection electrodes 321 that are rectangular are disposed in a matrix in the touch panel 301 according to the Comparative Example. A plurality of the touch detection electrodes 321 include touch detection electrodes 321a to 321c. The touch detection electrodes 321c, 321a, and 321b are disposed in this order in the X direction. In this example, an indicator was moved from position P1a toward position P2a (in the X direction)

while touching the touch panel 301, and signal intensities of each of the touch detection electrodes 321a to 321c were measured.

As shown in FIG. 15, the touch detection electrodes 321b and 321c exhibited $9.02 \times 10^{-14}$ at a center position P3a of the touch detection electrode 321a, which is an intermediate point between position P1a and position P2a.

Results from Example

As illustrated in FIG. 2, in the touch panel 1 according to the Example of the first embodiment, the touch detection electrodes 21 are disposed in the order of the touch detection electrodes 21c, 21a, and 21b, in the X direction. In this example, an indicator was moved from position P1 toward position P2 (in the X direction) while touching the touch panel 1, and signal intensities of each of the touch detection electrodes 21a to 21c were measured.

As shown in FIG. 16, the touch detection electrodes 21b and 21c exhibited $1.62 \times 10^{-13}$ at a center position P3 of the touch detection electrode 21a, which is an intermediate point between position P1 and position P2. As a result, it was found that the signal intensities of the touch detection electrodes 21b and 21c adjacent to the touch detection electrode 21a in the touch panel 1 according to the Example of the first embodiment were greater as compared to the results of the touch panel 301 according to the Comparative Example ($9.02 \times 10^{-14}$). Accordingly, touch coordinates (center-of-gravity position) can be found on the basis of signals from not only the touch detection electrode 21a, but the touch detection electrodes 21b and 21c as well, and accordingly detection precision of touch coordinates can be improved.

Modifications

Embodiment have been described above, but the above-described embodiments are only exemplifications for carrying out the present disclosure. Accordingly, the present disclosure is not limited to the above-described embodiments, and the present disclosure can be carried out with the above-described embodiments modified variously without departing from the spirit and scope thereof.

(1) Although an example has been described in the first and second embodiments above in which the touch panel is configured so as to have a function of displaying video, the present disclosure is not limited thereto. That is to say, the touch panel may be configured so as to have touch detection functions, without having functions of displaying video.

(2) Although an example has been described in the first and second embodiments above in which the connecting lines are formed in the same layer as the layer in which the touch detection lines are formed, and in which the connecting lines are formed in the same layer as the layer in which the pixel electrodes are formed, the present disclosure is not limited thereto. The connecting lines may be formed in a layer that is dedicated for the connecting lines, separate from the layer in which the touch detection lines or the pixel electrodes are formed.

(3) Although an example has been described in the first and second embodiments above in which the touch detection electrode layer and the pixel electrode layer are made of ITO, the present disclosure is not limited thereto. For example, the touch detection electrode layer and the pixel electrode layer may be made of a metal mesh.

(4) Although an example has been described in the first and second embodiments above in which the sub-portions are rectangular, the present disclosure is not limited thereto. For example, the sub-portions (and main portions) may be formed as circular or polygonal shapes.

(5) Although an example has been described in the first and second embodiments above in which the connecting lines are formed in parallel to the touch detection lines, the present disclosure is not limited thereto. The connecting lines may be formed so as to intersect the touch detection lines.

(6) Although an example has been described in the first and second embodiments above in which a configuration is made such that the area of the main portions is larger than the area of the sub-portions, the length of the main portions in the X direction is greater than the length of the sub-portions (each one) in the X direction, and the length of the main portions in the Y direction is greater than the length of the sub-portions (each one) in the Y direction, the present disclosure is not limited thereto. That is to say, the area of the main portions may be no larger than the area of the sub-portions. Also, the length of the main portions in the X direction may be no greater than the length of the sub-portions (each one) in the X direction. The length of the main portions in the Y direction may be no greater than the length of the sub-portions (each one) in the Y direction.

The above-described configuration can also be described as follows.

A touch panel according to a first configuration includes a substrate, a first touch detection electrode that is disposed on the substrate and generates capacitance between the first touch detection electrode and an indicator, a second touch detection electrode that is formed in a first layer in which the first touch detection electrode is formed, and that is disposed at a position in a first direction as to the first touch detection electrode, a first touch detection electrode line that connects the first touch detection electrode and a detection circuit that receives a signal from the first touch detection electrode, and a second touch detection electrode line that connects the second touch detection electrode and a detection circuit that receives a signal from the second touch detection electrode. The first touch detection electrode includes a first main portion to which the first touch detection electrode line is connected, and a first sub-portion that is disposed away from the first main portion. The second touch detection electrode includes a second main portion to which the second touch detection electrode line is connected, and a second sub-portion that is disposed away from the second main portion. The first sub-portion and the second sub-portion are disposed between the first main portion and the second main portion. The touch panel further includes a first connecting line that is formed in a second layer that is different from the first layer, and that connects the first main portion and the first sub-portion, and a second connecting line that is formed in a third layer that is different from the first layer, and that connects the second main portion and the second sub-portion (first configuration).

According to the above first configuration, the first sub-portion that is disposed away from the first main portion is electrically connected to the first main portion by the first connecting line, and the second sub-portion that is disposed away from the second main portion is electrically connected to the second main portion by the second connecting line. The first sub-portion that is disposed away from the first main portion is disposed between the first main portion and the second main portion, and the second sub-portion that is disposed away from the second main portion is disposed between the first main portion and the second main portion. Accordingly, even in a case in which the indicator touches between the first main portion and the second main portion, the detection circuit can acquire signals from both of the first touch detection electrode and the second touch detection electrode. As a result, touch coordinates can be found on the basis of signals from a plurality of touch detection electrodes, which are the first touch detection electrode and the second touch detection electrode, and thus detection precision of touch coordinates can be improved.

In the first configuration, the second layer may be the same layer as the third layer (second configuration).

According to the above second configuration, the number of manufacturing steps of the touch panel can be reduced as compared to a case of forming the second layer and the third layer as separate layers.

In the first or second configurations, the first touch detection electrode line may be formed in a fourth layer that is different from the first layer. The second layer may be the same layer as the fourth layer (third configuration).

According to the above third configuration, the first touch detection electrode line can be disposed so as to overlap the first touch detection electrode or the second touch detection electrode in plan view. As a result, the size of the touch panel can be reduced in a planar direction.

In the third configuration, the first touch detection electrode line and the second touch detection electrode line may be configured so as to extend in a second direction that intersects the first direction. The first connecting line may be configured so as to extend in the second direction (fourth configuration).

According to the above fourth configuration, the first touch detection electrode line and the second touch detection electrode line do not intersect the first connecting line, and accordingly the first touch detection electrode line and the second touch detection electrode line, and the first connecting line can be formed in the same layer.

In the third or fourth configuration, the first touch detection electrode line and the second touch detection electrode line may be configured to extend in a second direction that intersects the first direction. The touch panel may further include a third touch detection electrode that is disposed at a position in the second direction with respect to the first touch detection electrode, and that is formed in the first layer, and a third touch detection electrode line that connects the third touch detection electrode and a detection circuit that receives a signal from the third touch detection electrode. The third touch detection electrode may further include a third main portion to which the third touch detection electrode line is connected, and a third sub-portion that is disposed away from the third main portion, and the first touch detection electrode may further include a fourth sub-portion that is disposed between the first main portion and the third main portion. The touch panel may further include a third connecting line that connects the third main portion and the third sub-portion, and a fourth connecting line that connects the first main portion and the fourth sub-portion. At least one of the third connecting line and the fourth connecting line may be formed in a fifth layer that is different from the fourth layer (fifth configuration).

According to the above fifth configuration, even in a case in which the indicator touches between the first main portion and the third main portion, the detection circuit can acquire signals from both of the fourth sub-portion of the first touch detection electrode and the third sub-portion of the third touch detection electrode. As a result, touch coordinates can be found on the basis of signals from a plurality of touch detection electrodes, which are the first touch detection electrode and the third touch detection electrode, and thus detection precision of touch coordinates can be improved in the second direction as well.

In any one of the first to fifth configurations, the first sub-portion and the second sub-portion may be disposed in a checkerboard pattern in plan view (sixth configuration).

According to the above sixth configuration, the first sub-portion and the second sub-portion can be disposed in an intermingled manner, and thus a situation in which the indicator comes into close proximity with (touches) just one of the first sub-portion and the second sub-portion can be suppressed.

A touch-panel-equipped display device according to a seventh configuration includes the touch panel according to any one of the first to sixth configurations, and a pixel electrode formed on the substrate (seventh configuration).

According to the above seventh configuration, a touch-panel-equipped display device can be provided that enables improved detection precision of touch coordinates.

The present disclosure contains subject matter related to that disclosed in Japanese Priority Patent Application JP 2023-104578 filed in the Japan Patent Office on Jun. 26, 2023, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. A touch panel, comprising:
a substrate;
a first touch detection electrode that is disposed on the substrate, and that generates capacitance between the first touch detection electrode and an indicator;
a second touch detection electrode that is formed in a first layer in which the first touch detection electrode is formed, and that is disposed at a position in a first direction as to the first touch detection electrode;
a first touch detection electrode line that connects the first touch detection electrode and a detection circuit that receives a signal from the first touch detection electrode;
a second touch detection electrode line that connects the second touch detection electrode and another detection circuit that receives a signal from the second touch detection electrode;
a first connecting line; and
a second connecting line, wherein
the first touch detection electrode includes a first main portion to which the first touch detection electrode line is connected, and a first sub-portion that is disposed away from the first main portion,
the second touch detection electrode includes a second main portion to which the second touch detection electrode line is connected, and a second sub-portion that is disposed away from the second main portion,
the first sub-portion and the second sub-portion are disposed between the first main portion and the second main portion,
the first connecting line is formed in a second layer that is different from the first layer, and connects the first main portion and the first sub-portion, and
the second connecting line is formed in a third layer that is different from the first layer, and connects the second main portion and the second sub-portion.

2. The touch panel according to claim 1, wherein the second layer is the same layer as the third layer.

3. The touch panel according to claim 1, wherein the first touch detection electrode line is formed in a fourth layer that is different from the first layer, and the second layer is the same layer as the fourth layer.

4. The touch panel according to claim 3, wherein the first touch detection electrode line and the second touch detection electrode line extend in a second direction that intersects the first direction, and the first connecting line extends in the second direction.

5. The touch panel according to claim 3, wherein the first touch detection electrode line and the second touch detection electrode line extend in a second direction that intersects the first direction, the touch panel further comprising:
  a third touch detection electrode that is disposed at a position in the second direction with respect to the first touch detection electrode, and that is formed in the first layer;
  a third touch detection electrode line that connects the third touch detection electrode and a detection circuit that receives a signal from the third touch detection electrode;
  a third connecting line; and
  a fourth connecting line, wherein
the third touch detection electrode includes a third main portion to which the third touch detection electrode line is connected, and a third sub-portion that is disposed away from the third main portion,
the first touch detection electrode further includes a fourth sub-portion that is disposed between the first main portion and the third main portion,
the third connecting line connects the third main portion and the third sub-portion, and the fourth connecting line connects the first main portion and the fourth sub-portion, and
at least one of the third connecting line and the fourth connecting line is formed in a fifth layer that is different from the fourth layer.

6. The touch panel according to claim 1, wherein the first sub-portion and the second sub-portion are disposed in a checkerboard pattern in a plan view.

7. A touch-panel-equipped display device, comprising:
the touch panel according to claim 1; and
a pixel electrode formed on the substrate.

* * * * *